(12) United States Patent
Rudi

(10) Patent No.: US 6,522,500 B1
(45) Date of Patent: Feb. 18, 2003

(54) TAPE CARTRIDGE FOR EXTREMELY WIDE TAPE HAVING AN ACCESS OPENING ALLOWING EXTRACTION OF TAPE, AND TAPE DRIVE FOR USE THEREWITH

(75) Inventor: Guttorm Rudi, Fjellhamar (NO)

(73) Assignee: O-Mass AS, Oslo (NO)

( * ) Notice: Subject to any disclaimer, the term of this patent is extended or adjusted under 35 U.S.C. 154(b) by 223 days.

(21) Appl. No.: 09/691,165

(22) Filed: Oct. 19, 2000

(51) Int. Cl.7 .............................................. G11B 23/02
(52) U.S. Cl. ...................................................... 360/132
(58) Field of Search .......................... 360/132; 242/341, 242/347.1, 347.2, 347

(56) References Cited

U.S. PATENT DOCUMENTS

| | | | |
|---|---|---|---|
| 695,639 A | 3/1902 | Goerz | 272/345 |
| 3,138,081 A | 6/1964 | Nerwin | 396/512 |
| 3,377,438 A | 4/1968 | Schroter | 360/96.2 |
| 3,653,608 A | * 4/1972 | Dickens et al. | 206/408 |
| 3,934,839 A | * 1/1976 | Serizawa | 242/342 |
| 4,019,695 A | 4/1977 | Wharam | 242/347.2 |
| 4,302,787 A | * 11/1981 | Itani | 360/132 |
| 5,415,360 A | * 5/1995 | Kim et al. | 242/347.2 |
| 5,712,744 A | * 1/1998 | Sakama et al. | 360/85 |
| 6,267,313 B1 | 7/2001 | Saliba et al. | 242/345 |

* cited by examiner

*Primary Examiner*—David Davis
(74) *Attorney, Agent, or Firm*—Schiff Hardin & Waite

(57) ABSTRACT

A magnetic recording cartridge has a housing enclosure with two tape reels rotatably mounted in the housing enclosure, and a magnetic data recording tape wound on the reels for winding and unwinding between the two reels in a tape transport direction, the tape having a width perpendicular to the tape transport direction of at least approximately 2.5 inches. The housing enclosure has two reel access openings respectively disposed in registration with the reels, allowing external access to the reels by a drive for rotating the reels, and a tape access opening allowing external access to the tape for engagement with a data transfer head also carried by the drive. Because of the significantly increased width of the tape, the tape has a surface area available for data recording which is approximately ten times greater than that of conventional tapes. Such a single, extremely wide tape can store as much data as a conventional, fully loaded autoloader magazine, containing approximately ten conventional tape cartridges.

29 Claims, 9 Drawing Sheets

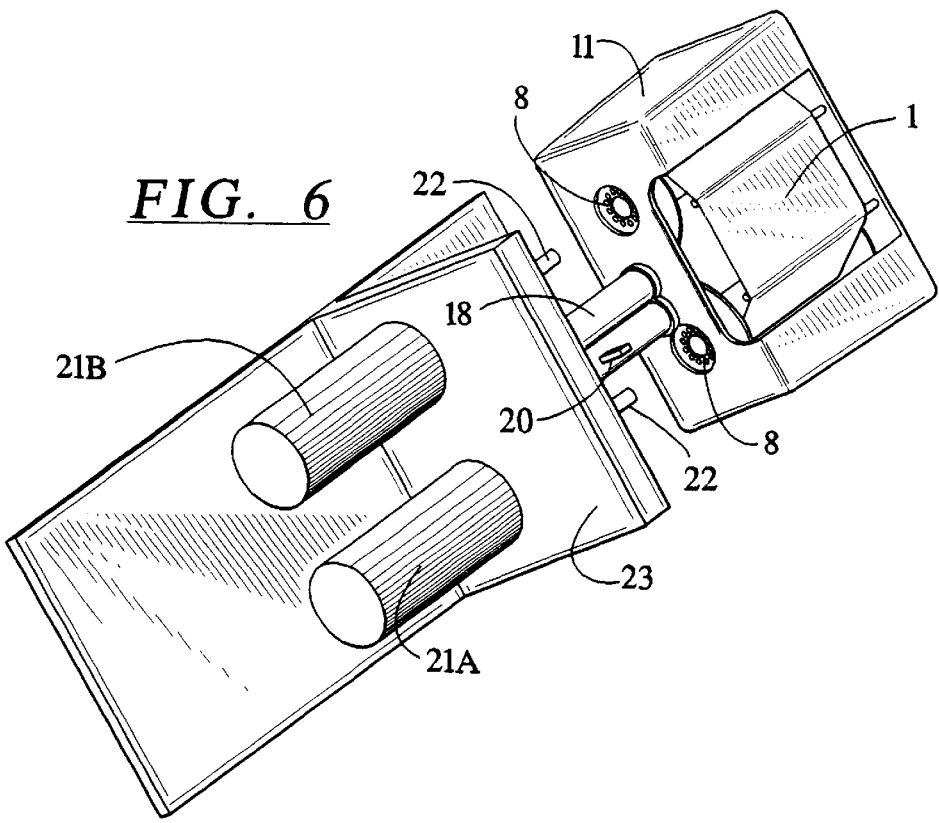
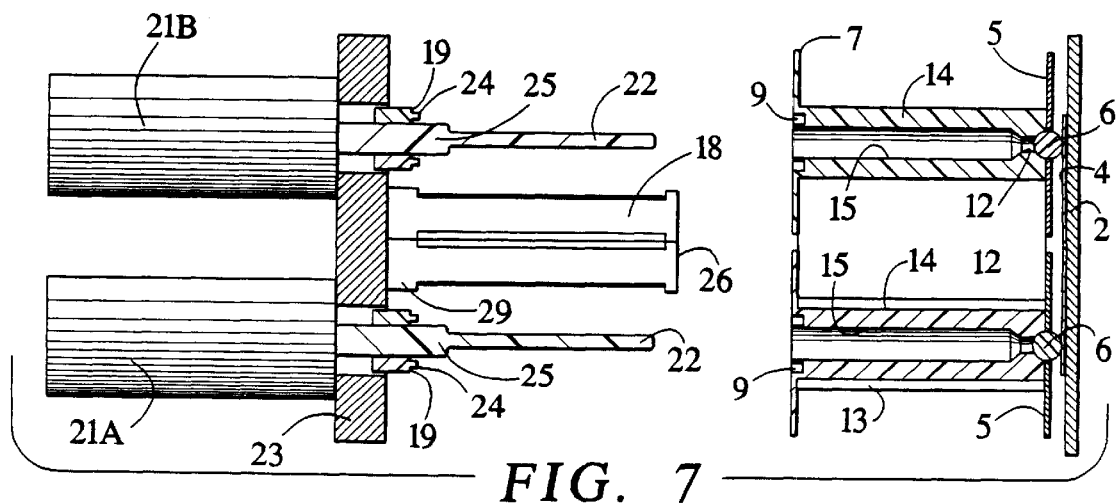

TAPE CARTRIDGE FOR EXTREMELY WIDE TAPE HAVING AN ACCESS OPENING ALLOWING EXTRACTION OF TAPE, AND TAPE DRIVE FOR USE THEREWITH

BACKGROUND OF THE INVENTION

1. Field of the Invention

The present invention is directed to a tape cartridge and a tape drive for accommodating an extremely wide tape.

2. Description of the Prior Art

The use of magnetic tape as a medium for data recording has the significant advantages of a relatively low cost and a relatively large recording surface area. Nevertheless, conventional magnetic tape has certain disadvantages associated therewith.

A first of these disadvantages is that tape is a sequential medium, which means that when a data transfer head is located at a beginning of a tape, it is necessary for the tape to be transported along its entire length in order to retrieve (or re-write) information at the end of the tape.

A second disadvantage is that, due to the desire and necessity of storing as much data as possible within an available tape area, the data transfer head technology as well as the recording media technology are pushed to their quality limits.

Moreover, many existing drives and cartridges must be designed within specified form factors, in order to satisfy standardization requirements. As an increasing number of functions become available, which are desired to be accommodated in a drive or on a tape, data storage area or other functions must be sacrificed to accommodate the new, additional functions, or some type of compromise must be reached in the overall design.

Among the more important market requirements which are expected in the near future for data storage on tape is that the need for higher storage capacity will continue to increase, at an even faster rate than previously. As discussed below, for example, the storage capacity of a currently available single cartridge is not sufficient for unattended backup during a longer period of time, and therefore so-called autoloader systems have been developed to automatically insert and remove a number of cartridges in a sequence.

Further market requirements are expected to be a need for faster time to access data, a need for an increased data transfer rate, a lower cost per MB (megabyte) and an overall improved quality and reduced cost.

As noted above, the limited data storage capacity of conventional cartridges has resulted in the development of autoloader systems. Conventional autoloader systems, however, are not a satisfactory solution to the problem of storing a large amount of data in an unattended backup procedure over a relatively long period of time. Several disadvantages exist with regard to currently available autoloader systems.

Because such autoloader systems make use of a large number of cartridges, the cartridges are made relatively small, and therefore have a limited space available for use for data storage. Typically, six to ten of such cartridges must be put in a magazine in order to have sufficient storage area (capacity). Because of the relatively small size of the cartridges, the drive is also made small, in order to match standardized form factors. The drive is disposed in a system housing, which also contains robotics, electronics and software needed for loading an unloading the cartridges.

The relatively large number of components, and therefore the relatively high cost, associated with conventional autoloader systems makes the use of such systems an unattractive alternative for a customer who merely wants long term data backup.

SUMMARY OF THE INVENTION

It is an object of the present invention to provide a magnetic tape cartridge, and a drive therefor, which contains a tape having a maximum tape length in a range comparable to the most commonly used high capacity cartridges (LTO, DLT), and which has a minimum tape length in a range comparable to that for conventional fast access cartridges (STK98-40, Magstar, Accellis), but which nevertheless has a data storage capacity which is many multiples more than such conventional magnetic tapes.

The above object is achieved in a magnetic tape cartridge in accordance with the principles of the present invention which accommodates a tape having an extremely large width. The width of the tape in the inventive cartridge can be greater by a factor of six to ten, for example, compared to the aforementioned conventional tapes. The following table compares the inventive tape to several standard formats that are currently in use:

| Cartridge/tape standard | Standard tape width in mm | Number of cartridges in a magazine | Width of new tape in mm |
| --- | --- | --- | --- |
| DDS | 4 | 6–10 | 24–40 |
| QIC | 6.35 | 6–10 | 38.1–63.5 |
| AIT/MAMMOTH/ SLR | 8 | 6–10 | 48–80 |
| LTO/DLT | 12.7 | 6–10 | 76.2–127 |

The inventive tape, thus, has a width which is greater than approximately 24 mm, or in a range between approximately 24 mm and approximately 127 mm.

A tape of such an increased width has a tape area available for data storage which corresponds to the respective tape areas of approximately six to ten of the aforementioned conventional cartridges, and thus the storage area available on a single inventive tape cartridge would correspond to the data storage available in a completely filled magazine in a conventional autoloader system. An autoloader magazine completely filled with cartridges contains approximately eight to ten times more parts and components, and therefore by replacing such a magazine with a single inventive cartridge, a considerable cost reduction is achieved.

The inventive drive for operating the inventive cartridge has a form factor which is smaller than, or the same as, the form factor used in a conventional autoloader system. This means there is room to accommodate robust, high quality drive mechanics for accepting the inventive extremely wide tape cartridge. Since only a single cartridge is necessary in order to achieve the same storage capacity as a completely filled magazine in a conventional autoloader system, there is no need to repeatedly load and unload the inventive, wide cartridge, and thus conventional autoloader components such as robotics, control electronics, and control software are not necessary, thereby producing a further cost reduction.

Moreover, in general because the number of parts and components associated with the inventive cartridge and drive is considerably reduced compared to a conventional autoloader system, space is made available for a very robust design, and the quality level will be much higher, and the cost lower, due to the considerable reduction in components.

As noted above, strictly in terms of size, the tape area available for data storage in the inventive cartridge is in the range of a fully loaded DLT/LTO magazine, accommodating approximately eight to ten conventional cartridges. The available data storage in the inventive cartridge will in reality be even larger, however, because in any cartridge the edge effects preclude storage of data at the extreme edges of the tape. In the inventive cartridge, only two such edge regions are present, whereas in a fully loaded conventional magazine accommodating ten conventional cartridges, twenty such edge regions exist.

In any high speed tape drive/cartridge system, a limitation on the mechanical speed at which the tape can be moved exists due to the unavoidable fact that air will be trapped at regions close to the moving tape, thereby producing "tape lift." Due to the increased width of the tape in the inventive cartridge, it is recognized that more air will be trapped than in a conventional cartridge, and this will impose a limitation on the winding speed. Nevertheless, the time to data still will be significantly reduced because there is no need to expend time for robotically loading and unloading one or more cartridges. It is possible to proceed directly to the desired data on the inventive tape. Writing data to completely fill the tape also will be much faster, for the same reason. Moreover, the significantly increased width of the inventive tape allows multiple read/write heads to be disposed and operated in parallel, respectively writing and/or reading in parallel tracks on the wide tape, thereby further increasing the data transfer rate.

The inventive cartridge and drive system also will be more user friendly than a conventional autoloader system, since the inventive cartridge, although wider than a conventional cartridge, still has only one housing, and therefore the overall weight of the inventive cartridge will be significantly smaller than the weight of a fully loaded autoloader magazine. Such autoloader magazines are conventionally made to be transportable, such as by means of a handle attached to the magazine housing, but the weight of a fully loaded magazine consists of the magazine housing itself, plus approximately ten cartridges, each with its own cartridge housing.

Lastly, the inventive cartridge/drive system has the advantage compared to an autoloader system of not requiring robotics and other moving parts, which contribute to acoustical noise in a conventional autoloader system.

DESCRIPTION OF THE DRAWINGS

FIG. 6 is an isomeric view from below of the inventive cartridge and drive of FIG. 5, as seen from below.

FIG. 7 is a sectional view through the inventive drive and cartridge in the unload position.

DESCRIPTION OF THE PREFERRED EMBODIMENTS

Figure 1:
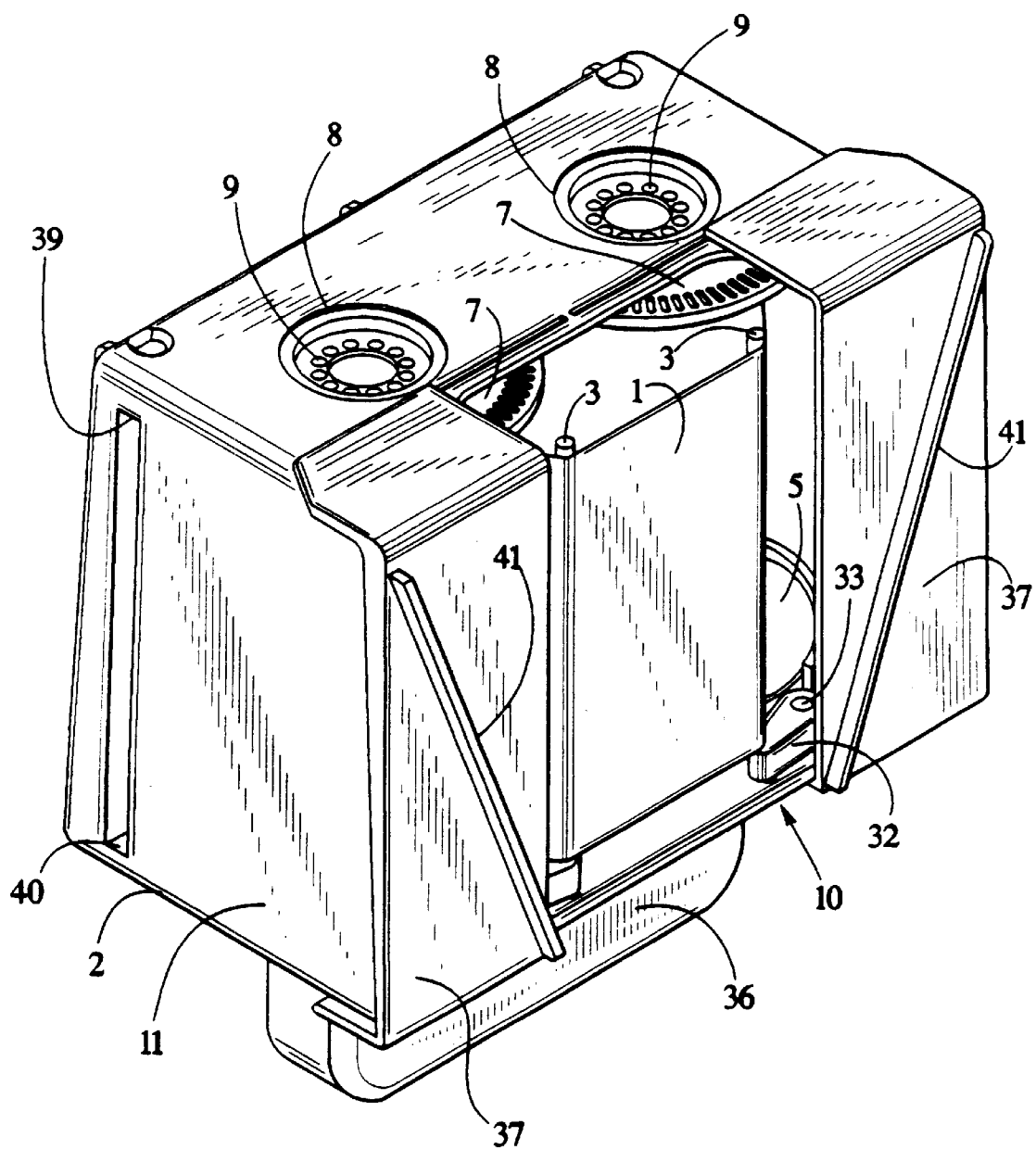
FIG. 1 is an isomeric view of an inventive cartridge, seen from the front.
Figure 1A:
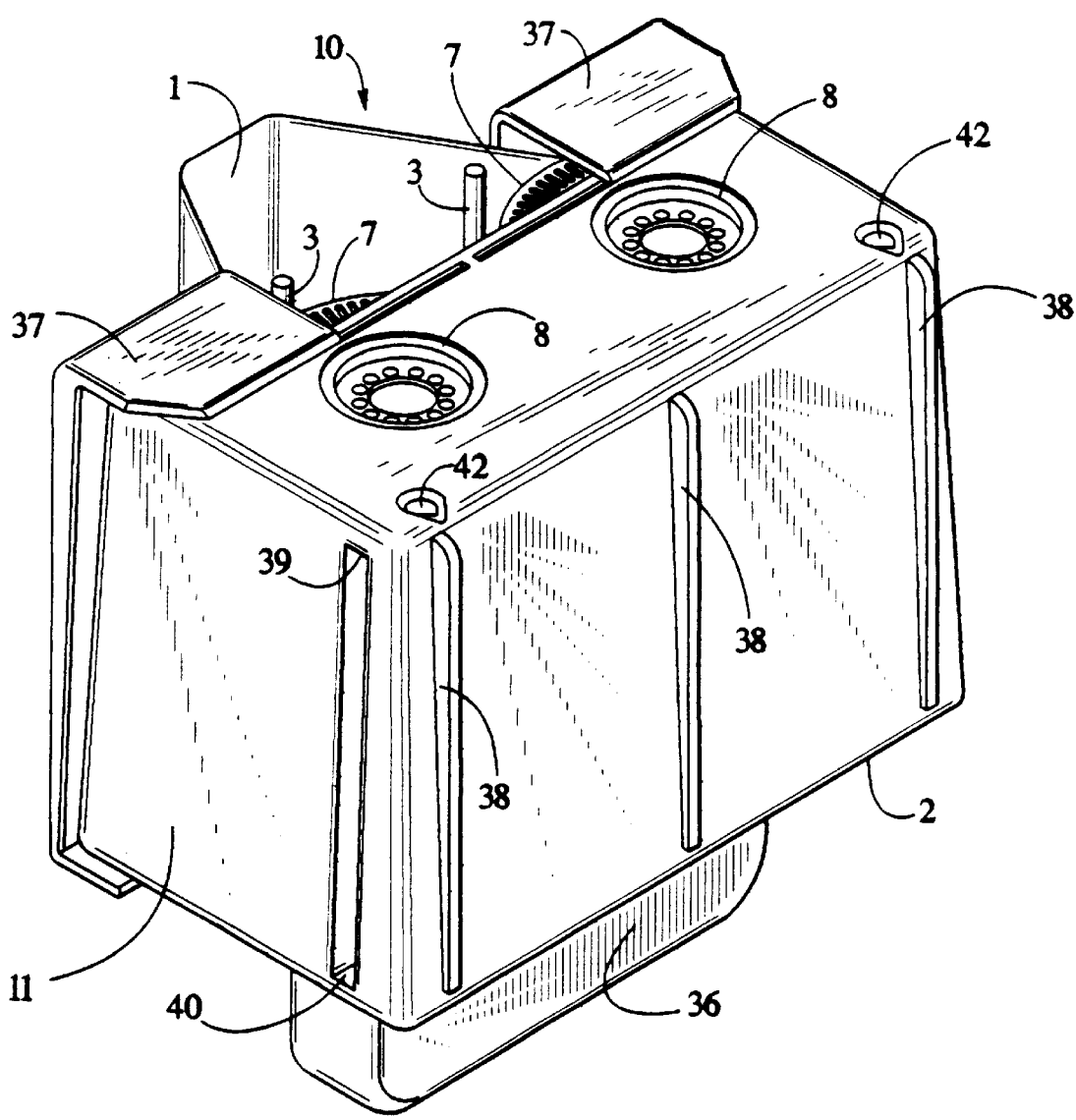
FIG. 1a is an isomeric view of the inventive cartridge of FIG. 1 seen from the rear, with the tape slightly pulled out of the cartridge in a read/write position.

The inventive tape cartridge is shown in FIGS. 1 and 1A from the front and rear. The cartridge contains a magnetic data recording tape 1, which has a width (i.e., a dimension perpendicular to the direction of tape transport) which is significantly larger, such as by a factor of approximately ten, than conventional tapes. The tape 1 may have a width, for example, of approximately 2.5 inches or more.

The cartridge enclosure is formed by a rigid base plate 2, which may be composed of metal, and an upper housing 11, which may be composed of plastic. The housing 11 is permanently affixed to the base plate 2.

Within the enclosure formed by the base plate 2 and the housing 11, the tape 1 is wound on two rotatable reels. In FIG. 1, the upper reel flanges 7 of the respective reels can be seen, and one lower flange can be seen as well.

The cartridge enclosure has two slidable doors 37, each of which has a slanted rib 41 projecting therefrom. When the cartridge is inserted into a drive, the ribs 41 respectively slide along stationary projections in the drive, thereby forcing the doors 37 apart, to produce an opening 10, which exposes the tape 1. The tape 1 is disposed in the opening 10 by means of upright guide pins 3. In the embodiment shown in FIGS. 1 and 1A, the guide pins 3 are respectively mounted on rotatable tension arms 32, one of which can be seen in FIG. 1. The tension arms 32 are spring loaded (the spring not being shown) so as to be rotatable around respective pivot pins 33, one of which can be seen in FIG. 1.

The housing 11 has a vertical opening with notches 39 and 40, used for automatic loading and ejecting of the cartridge. The notch 39 is used for gripping the cartridge and pulling it into the drive, and the notch 40 is used for automatic ejection of the cartridge. The drive has a suitable latch mechanism which keeps the cartridge in the load position after the cartridge has been loaded therein.

The cartridge has a handle 36 affixed to the bottom of the base plate 2 to allow the cartridge to be easily carried by user. In all other views of the inventive cartridge, this handle 36 has been omitted for clarity.

In the view shown in FIG. 1A, the tape 1 has been pulled out of the cartridge to the read/write position. Also in the view shown in FIG. 1A, guide ribs 38 at the rear of the cartridge can be seen, which assists in guiding the cartridge into the drive. Also shown in FIG. 1A are positioning holes 42, which are used for final positioning of the cartridge in the drive relative to the data transfer head. Mating pins (not shown) are respectively received in the holes 42 for this final positioning.

FIGS. 1 and 1A also show access openings 8 in the top of the housing 11, through which the central regions of the respective top flanges 7 are accessible. These central regions have holes 9 therein which receive tappets 24 (see FIGS. 7 and 9) of the drive, for mechanically engaging the reels for rotation thereof.

Figure 2:
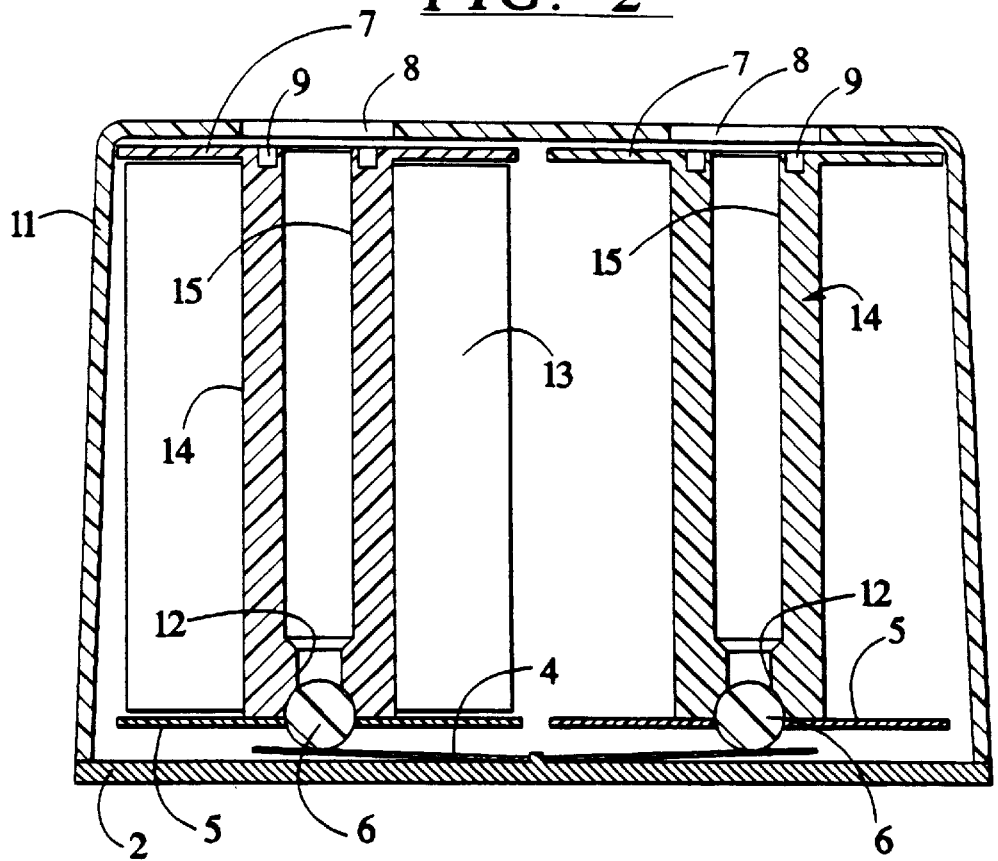
FIG. 2 is a sectional view through the inventive cartridge.
Figure 5:
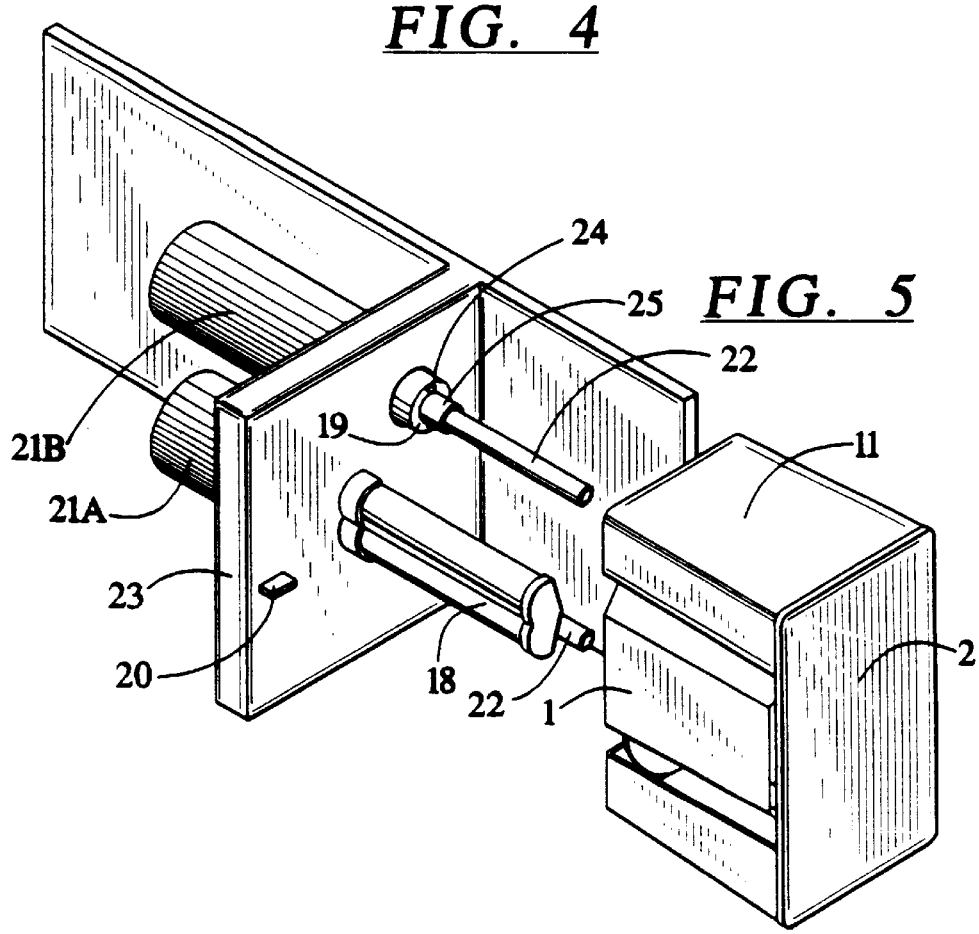
FIG. 5 is an isomeric view of the inventive drive and cartridge in the unload position.

FIG. 2 is a sectional view of the cartridge of FIGS. 1 and 1A. As can be seen therein, each reel has a hub core 14, from which an upper reel flange 7 and a lower reel flange 5 project. Each reel is mounted on a wear-resistant ball 6, which is disposed in a recess in the hub core 14. The ball 6 is held in place by the lower flange 5. A leaf spring 4 is centrally attached to the base plate 2, and is spring loaded against each of the balls 6, so as to pre-load the two reels in the axial direction, so as to force the top flanges 7 against the top of the housing 11, in the area around the access openings 8. A tape pack 13 is shown in FIG. 2 completely wound on one of the reels. Each hub core 14 has surfaces 12 and 15 which are used for the final radial alignment onto the motor shaft, as is shown in FIG. 5.

Figure 3:
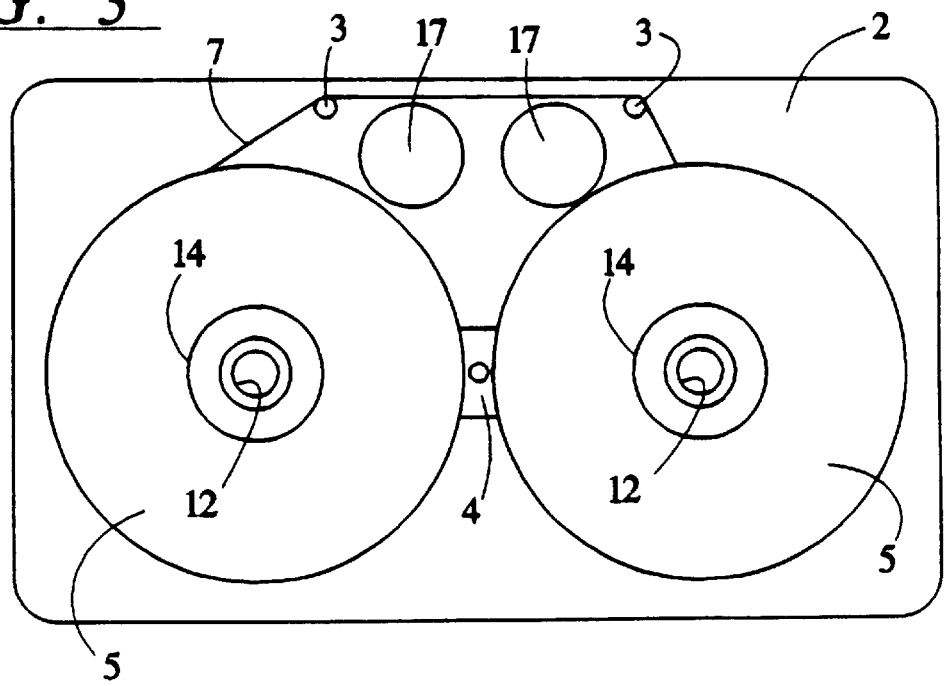
FIG. 3 is a schematic plan view of the inventive tape cartridge from above, with the housing removed, in an embodiment with rotating tape guides.

FIG. 3 shows a plan view, with a housing 11 removed, of the tape cartridge in an embodiment having rotating tape rollers 17. The cartridge is shown in the unload position, with the tape 1 resting on pins 3, which provide sufficient clearance to the rollers 17.

Figure 4:
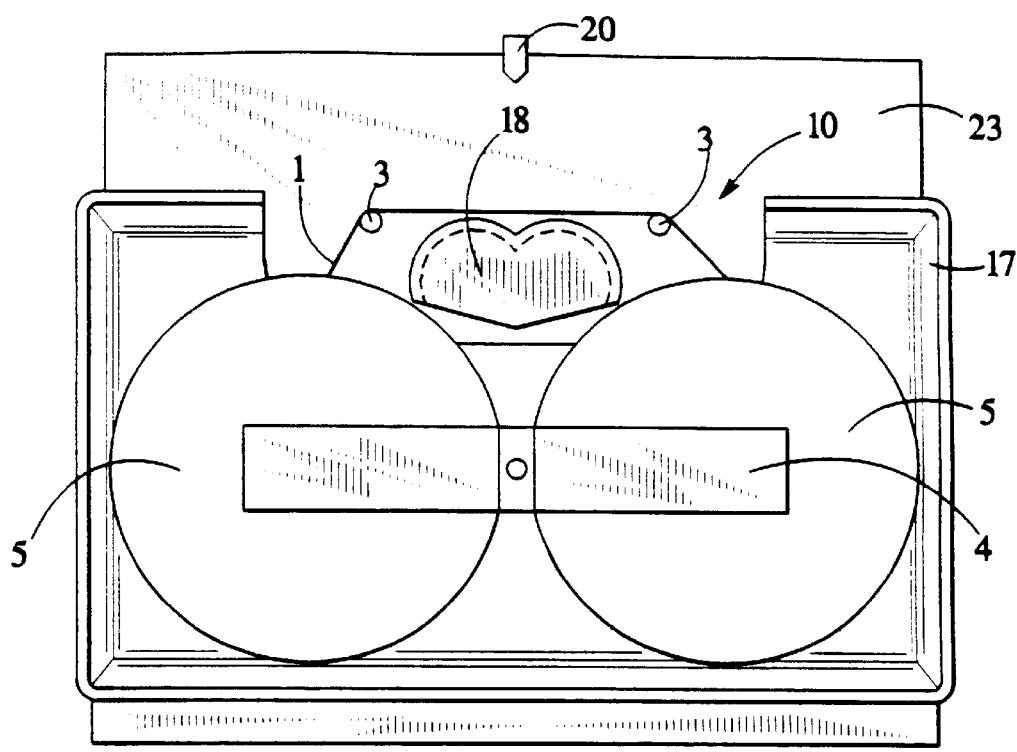
FIG. 4 is a plan view of the inventive tape cartridge, with the top of the housing removed, in an embodiment with non-rotating tape guides.

FIG. 4 shows an embodiment from below, with the base plate 2 removed, employing a stationary (non-rotating) tape guide 18. The cartridge is shown in the unload position with the tape resting on the pins 3. The read/write head 20 (data transfer head) is also shown, as is a portion of the mounting base plate 23 of the drive.

A suitable, known head positioning mechanism is used for moving the read/write head 20 in the perpendicular direction relative to the base plate 23.

FIGS. 5, 6, and 7 are different views of the cartridge and drive in the unload position, i.e., before a cartridge loading movement has started. The drive has the aforementioned mounting base plate 23, on which a hub motor 21B is mounted. The drive shaft of the motor 21 B projects through the other side of the mounting base plate 23, and has portions of successively decreasing diameter. The portion closest to the mounting base plate 23 has a reference surface 19, on which the aforementioned tappet 24 is disposed, which engages the holes in the hub core 14. When the cartridge is inserted into the drive, the leaf spring 4 will flex and the top flange 7 will be moved away from the interior surface of the top of the housing 11. The surfaces 12 and 15 in the hub core 14 will be radially aligned to the exterior surfaces of the other portions 22 and 25 of the drive shaft.

Coarse alignment of the reel by means of the drive shaft takes place as the cartridge is loaded into the drive, and more precise alignment is then effected as described above. The cartridge shell is precisely aligned relative to the drive by using the alignment holes 42.

Figure 8:
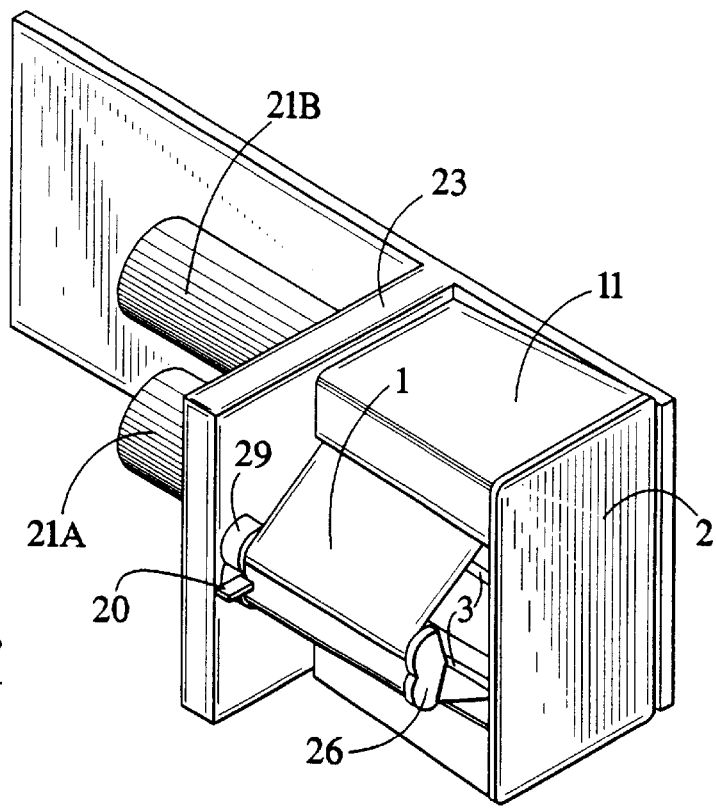
FIG. 8 is an isomeric view of the inventive cartridge loaded into the inventive drive, with the tape in a read/write (pulled out) position.

In the embodiment shown in FIGS. 5, 6 and 7, the non-rotating tape guide 18 is employed. During loading, the tape guide 18 is positioned relative to the mounting plate 23 so as to proceed inside of the tape 1, within the housing 11. For executing a read/write procedure (data transfer procedure) the guide 18 is moved by a guide motor 21a toward the read/write head 20, thereby pulling the tape 1 out of the cartridge and into a data transfer position relative to the read/write 20. This position is shown in FIG. 8, in which a top flange 26 and a base 29 of the guide 18 can be seen.

Figure 9:
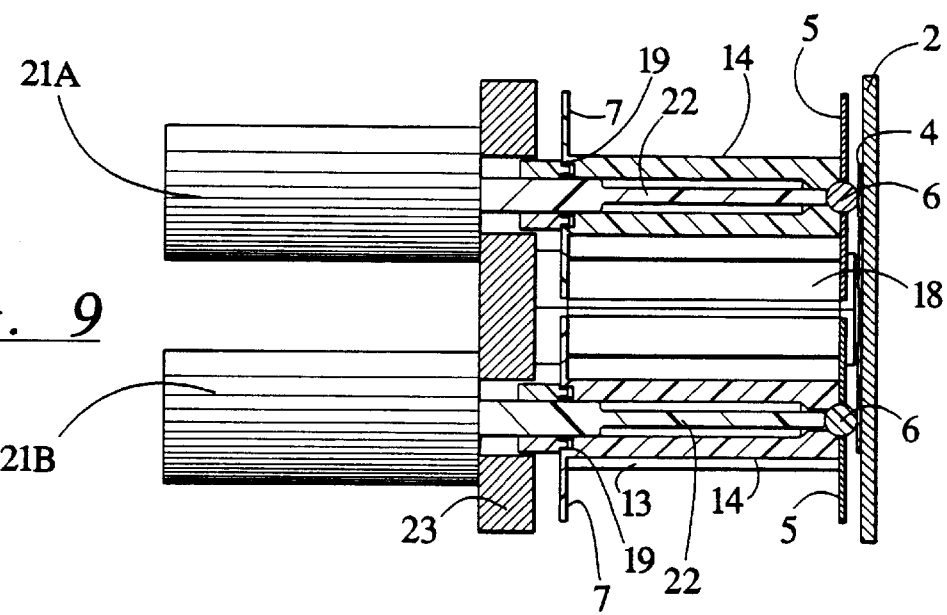
FIG. 9 is a section view through the inventive drive and cartridge in the load position.
Figure 10:
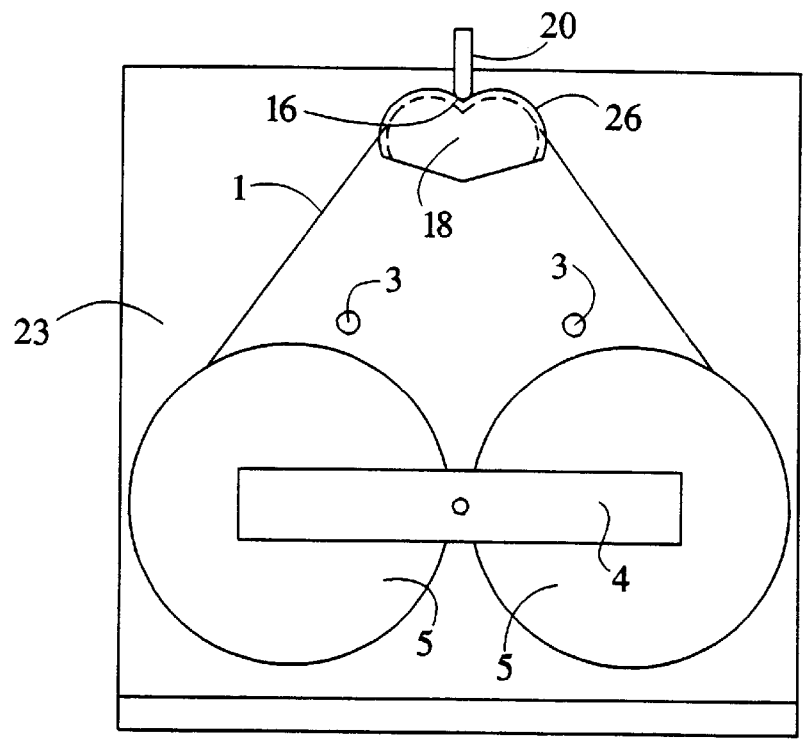
FIG. 10 is a schematic plan view of the inventive cartridge, as seen from below with the base plate removed, in the embodiment having stationary tape guides.

FIG. 9 is a sectional view showing the drive and the cartridge fully engaged for executing a read or write procedure. FIG. 10 is a schematic illustration showing the relative positions of the reels, the tape 1, the guide 18 and the read/write head 20, in a position close to the mounting base plate 23.

Figure 11:
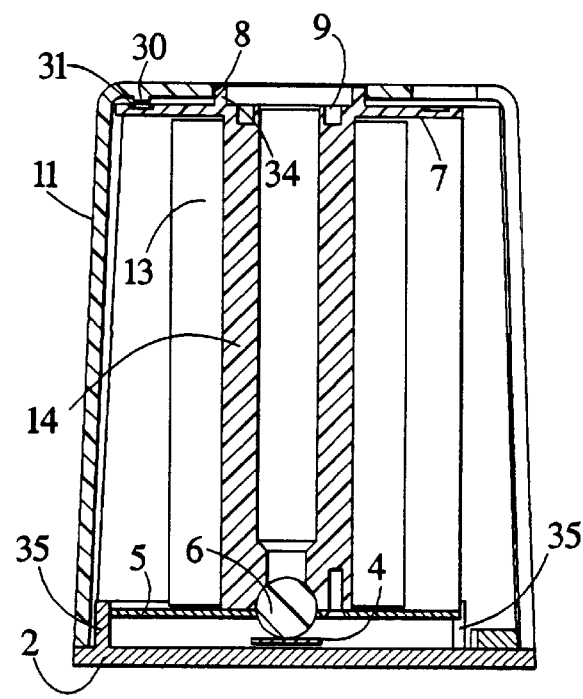
FIG. 11 is a sectional, side view through one reel, with a tape pack thereon, of the inventive cartridge.

FIG. 11 is a sectional view, from the side, showing one of the reels with the tape pack 13 wound thereon in the read/write position, wherein the reel (as well as the other reel) is free to rotate. In the unload position, the reel is normally spring loaded by the spring 4 against the interior surface of the top of the housing 11, causing engagement of a projection 30 on the interior surface of the housing 11 with a recess 31 in the top flange 7. In this position, the reel is also guided or held loosely in place by projecting ribs 35 from the base plate 2. This prevents rotation of the reels during handling and transport of the cartridge.

When the cartridge is loaded into the drive, the engagement of the drive shaft (not shown in FIG. 11) with the hub core 14 pushes the reel against the spring force of the spring 4, which slightly flexes toward the base plate 2, thereby releasing the reel for free rotation.

Figure 12:
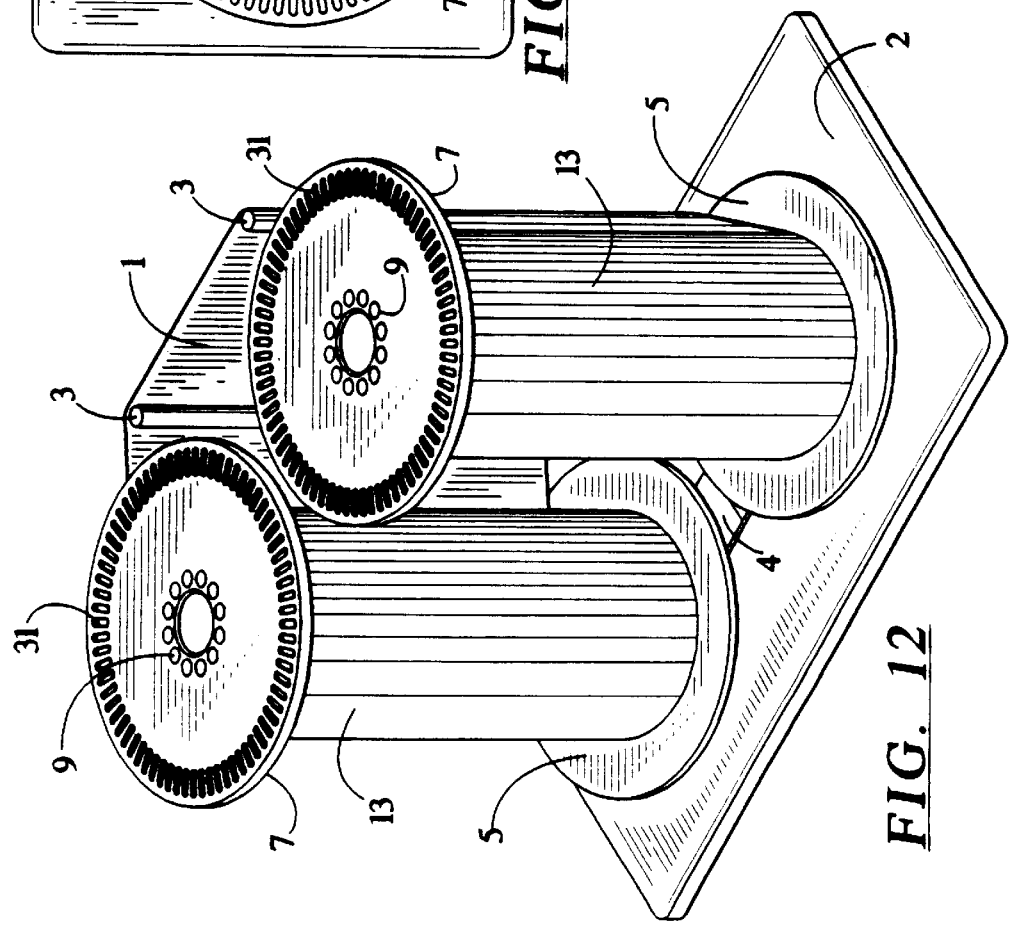
FIG. 12 is an isomeric view of the cartridge base plate, with the housing removed, showing the tape hubs with tape packs thereon, in the inventive cartridge.

FIG. 12 is a view of the cartridge with the housing 11 removed, showing the relationship of the components when the cartridge is fully loaded into the drive. As can be seen, the top reel flange 7 has a number of radial slots 31 therein, so that whatever rotational position the reel assumes in the unload condition, it will not rotate very far before one of the slots 31 engages the projection 30.

Figure 13:
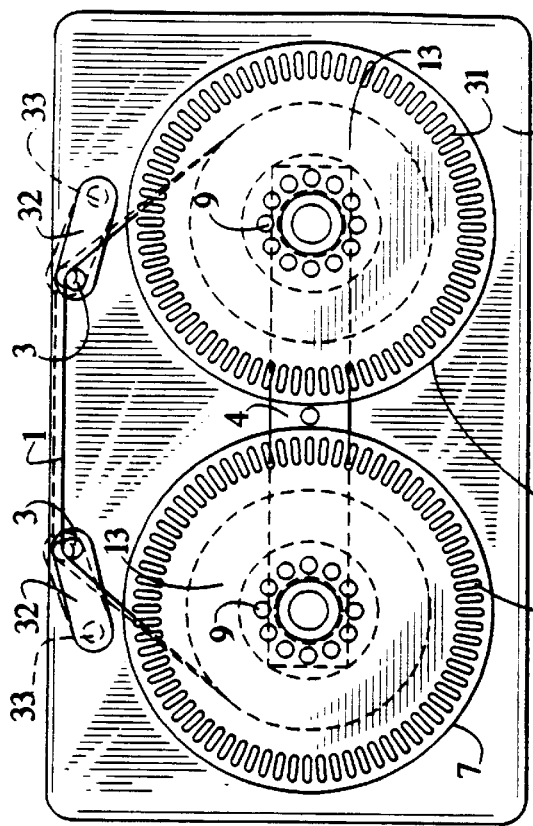
FIG. 13 is a plan view of the inventive cartridge, with the housing removed, showing an embodiment of a tape tensioning system in the unload position.

FIG. 13 shows a view with the housing 11 removed illustrating the tape tensioning arms 32 in more detail. As explained earlier, each tensioning arm 32 carries a guide pin 3 thereon, and is spring loaded so as to be rotatable around a pivot pin 33. The dashed lines show the amount of movement which can be effected by the tensioning arms 32 in order to maintain the tape 1 at proper tension.

Figure 14:
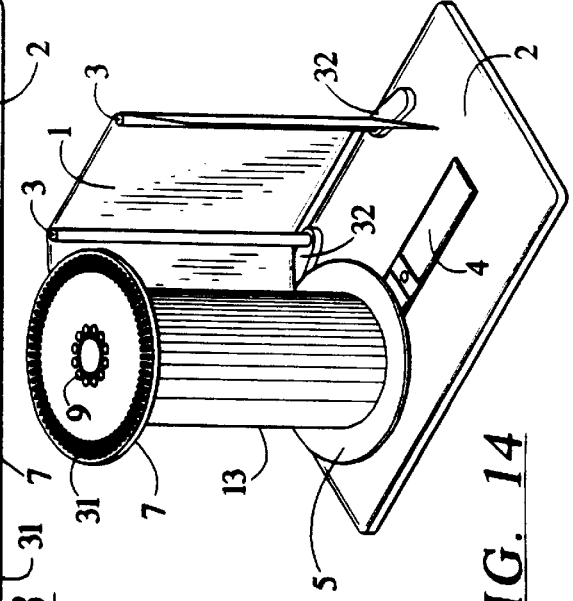
FIG. 14 is an isomeric view of one tape reel in the embodiment of FIG. 13.

The same embodiment is shown in FIG. 14, with one of the reels removed so that the arrangement of the tensioning arms 32 can clearly be seen.

In the embodiments described thus far, the tape 1, in order to effect data transfer, is pulled from the cartridge by moving a component such as the tape guide 18. In the alternative embodiment of FIGS. 15 and 15A, spring loaded arms 44, each carrying pins 43, are rotated around respective pivot pins 45 to move the tape 1 out of the cartridge, through the opening 10, in a loading procedure. The guide 18 is then moved into the thus-produced space. In the embodiment, therefore, the guide 18 moves only axially, but not laterally. The arms 44 are then released so that the tape 1 rests against the guide surface of the guide 18. FIG. 15A shows the read/write head 20 in position for data transfer.

Figure 15:
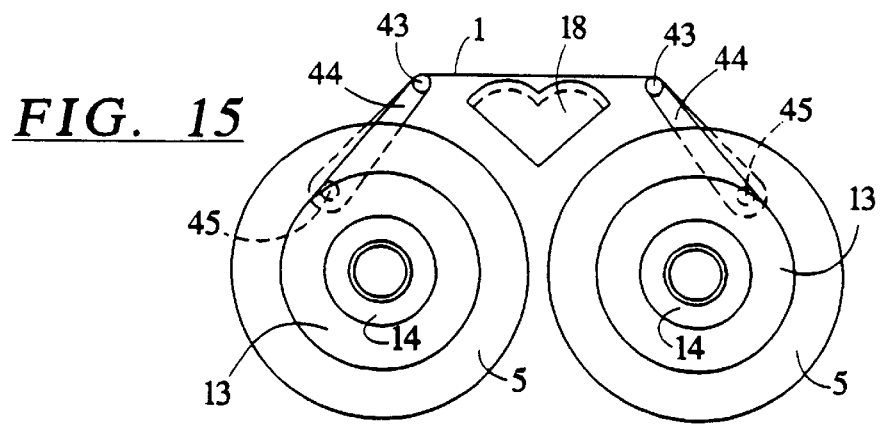
FIG. 15 is a schematic illustration of an embodiment of the inventive tape cartridge wherein it is not necessary to pull the tape from the cartridge, shown in the unload position.
Figure 15A:
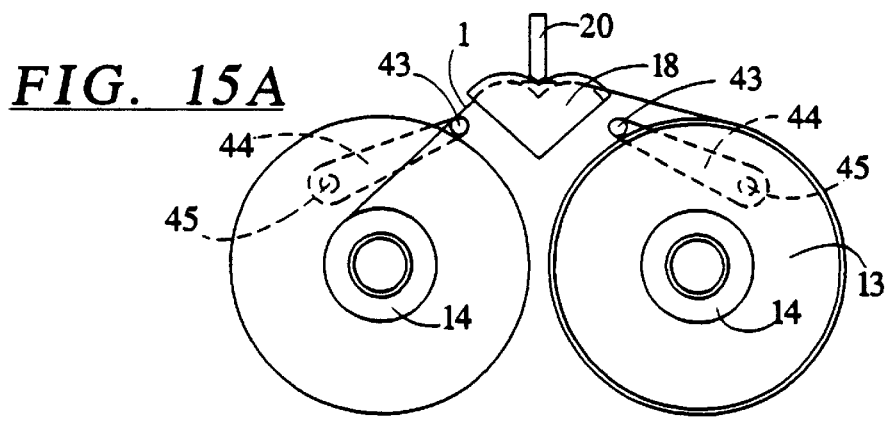
FIG. 15a is a schematic illustration of the embodiment of FIG. 15 in the read/write position.
Figure 16:
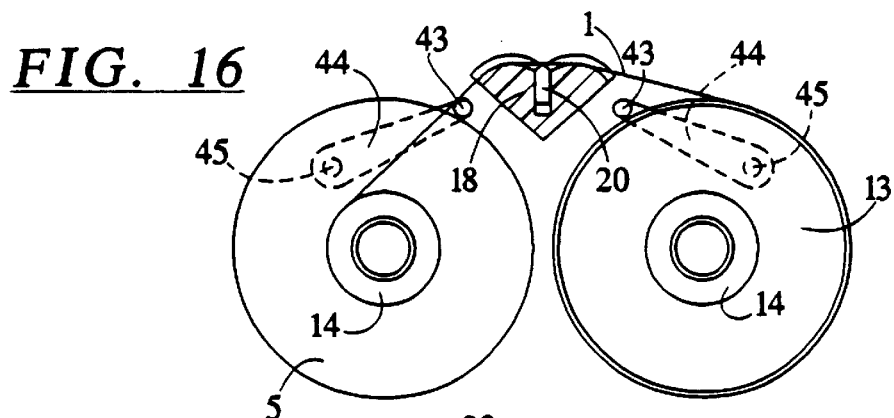
FIG. 16 is a schematic illustration of an embodiment of the inventive cartridge with the write head placed on the inner side of the tape path, employing stationary tape guides.

The embodiment shown in FIG. 16 operates in the same way as the embodiment of FIGS. 15 and 15A, however, in the embodiment of FIG. 16 the read/write head 20 is mounted in the guide 18.

Figure 17:
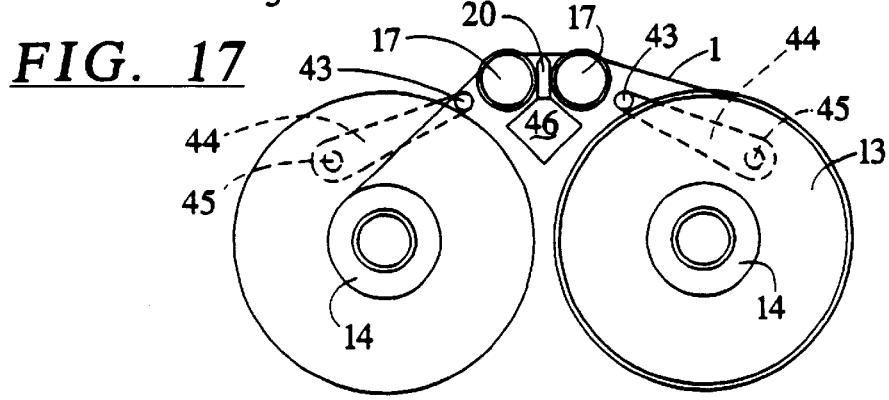
FIG. 17 is a further version of the embodiment of FIG. 16, employing rollers instead of the stationary tape guides.

FIG. 17 shows a similar embodiment, but instead of using a non-rotating guide 18, the aforementioned guide rollers 17 are used. A suitable head stepping mechanism 46 is disposed in the space between the guide rollers 17, for holding and positioning the read/write head 20 in a known manner.

It will be apparent to those of ordinary skill in the art that in the embodiments wherein the read/write head 20 is disposed at the interior side of the tape 1, the tape 1 must be wound on the reels so that the oxide-carrying side faces the interior. In the other embodiments, the tape 1 is wound on the reels so that the oxide-carrying side is disposed facing the exterior of the cartridge.

Although modifications and changes may be suggested by those skilled in the art, it is the intention of the inventor to embody within the patent warranted hereon all changes and modifications as reasonably and properly come within the scope of his contribution to the art.

I claim as my invention:

1. A magnetic recording cartridge comprising:
   a housing enclosure;
   two tape reels rotatably mounted in said housing enclosure;
   a magnetic data recording tape wound on said two reels for winding and unwinding between said two reels in a tape transport direction, said tape having a width perpendicular to said tape transport direction of at least approximately 24 mm; and
   said housing enclosure having two reel access openings respectively disposed in registration with the reels allowing external access to said reels for rotating said reels, and a tape access opening allowing external access to said tape and removal of a portion of said tape from said housing enclosure, and at least one sliding door normally closing said tape access opening and mounted to slide substantially parallel to said tape transport direction to expose said tape access opening.

2. A magnetic cartridge as claimed in claim 1 wherein said tape has said width perpendicular to said tape transport direction in a range between approximately 24 mm and approximately 127 mm.

3. A cartridge as claimed in claim 1 wherein said housing enclosure comprises a base plate and an upper housing portion affixed to said base plate.

4. A cartridge as claimed in claim 1 wherein said housing enclosure has a bottom and a top, and wherein each of said reels comprises a lower flange disposed at said bottom of said housing enclosure and an upper flange disposed at said top of said housing enclosure and a hub core connecting the lower flange and the upper flange, and wherein said cartridge further comprises a leaf spring mounted in said housing enclosure at said bottom of said housing enclosure and acting on the respective lower flanges of said reels to urge the respective upper flanges of said reels toward said top of said housing enclosure.

5. A cartridge as claimed in claim 4 wherein each of said top flanges has at least one slot therein, and wherein said top of said housing enclosure has an interior projection for engaging said slot to prevent rotation of said reels.

6. A cartridge as claimed in claim 4 wherein each of said hub cores has a recess therein at an end thereof adjacent said lower flange, and wherein each of said reels further comprises a wear-resistant ball mounted in said recess and disposed between each reel and said leaf spring, on which each reel is rotatable.

7. A cartridge as claimed in claim 1 wherein said housing enclosure includes a base plate defining a base plane, and further comprising guide pins mounted on said base plate and disposed for orienting said tape in said tape access opening substantially perpendicularly to said base plane.

8. A cartridge as claimed in claim 7 further comprising tape tensioning arms on which said pins are respectively mounted, said tape tensioning arms being pivotably mounted to said base plate.

9. A cartridge as claimed in claim 7 further comprising lever arms on which said pins are respectively mounted, said lever arms being pivotably mounted to said base plate and being rotatable to force said tape out of said housing enclosure through said tape access opening.

10. A cartridge and drive system comprising:
    a cartridge having a housing enclosure containing two rotatable reels and a tape wound between said two reels, said tape being movable between said two reels in tape transport direction and having a width, perpendicular to said tape transport direction, of at least 2.5 inches, and said housing enclosure having two reel access openings respectively in registration with the reels, allowing access to said reels from an exterior of said housing enclosure, and a tape access opening allowing access to said tape from the exterior of said housing enclosure and removal of a portion of said tape from said housing enclosure; and
    a tape drive comprising a drive motor having a drive shaft engageable through at least one of said reel access openings with the reel in registration with said at least one of said reel access openings for rotating the at least one reel engaged with said drive shaft, a magnetic data transfer head, and a mechanism for inserting said data transfer head through said access opening and for subsequently bringing said data transfer head into data transfer relationship with said tape after said at least one reel and said drive shaft are engaged, and for removing said portion of said tape from said housing enclosure.

11. A cartridge and drive system as claimed in claim 10 wherein said mechanism comprises a head stepping mechanism, on which said data transfer head is mounted, mounted in said drive.

12. A cartridge and drive system as claimed in claim 10 wherein said mechanism comprises a non-rotating tape guide mounted in said drive.

13. A cartridge and drive system as claimed in claim 12 wherein said tape guide is mounted in said drive so as to be laterally movable, and wherein said drive comprises a further drive motor engaging said tape guide for laterally moving said tape guide.

14. A cartridge and drive system as claimed in claim 12 wherein said data transfer head is mounted in said tape guide.

15. A cartridge and drive system as claimed in claim 10 wherein said mechanism comprises two guide pins respectively mounted on rotatable lever arms in said housing enclosure, said tape moving across and between said guide pins in said tape access opening, said lever arms being rotatable to move said pins and said tape through said access opening to the exterior of said housing enclosure.

16. A cartridge and drive system as claimed in claim 10 wherein each of said reels has an interior bore adapted to receive said drive shaft, and wherein each interior bore has alignment surfaces thereon engaging corresponding alignment surfaces on said drive shaft to precisely align said tape reels relative to said drive shaft.

17. A cartridge and drive system as claimed in claim 10 wherein said housing enclosure has a wall in which said two reel access openings are disposed, and a side perpendicular to said wall and parallel to said width of said tape, and wherein said tape access opening is disposed in said wall and in said side.

18. A cartridge and drive system as claimed in claim 17 wherein said tape access opening has a first portion in said wall adapted to allow insertion of a data transfer head through said first portion in a direction parallel to said width of said tape, and a second portion in said side for said removal of said portion of said tape from said housing enclosure in a direction perpendicular to said width of said tape and perpendicular to said tape transport direction.

19. A cartridge and drive system as claimed in claim 18 wherein said housing enclosure has at least one door mounted for sliding along said wall and along said side for opening and closing said tape access opening, said at least one door having a first door portion covering said first portion of said tape access opening and a second door portion covering said second portion of said tape access opening.

20. A cartridge and drive system as claimed in claim 19 wherein said at least one door has a rib disposed at an exterior thereof, said rib being oriented at an acute angle relative to said width of said tape.

21. A cartridge and drive system as claimed in claim 18 wherein said housing enclosure has two doors, each mounted for sliding on said wall and said side toward and away from each other for opening and closing said tape access opening, each of said two doors having a first door portion covering approximately one-half of said first portion of said tape access opening and a second door portion covering approximately one-half of said second portion of said tape access opening.

22. A cartridge and drive system as claimed in claim 21 wherein each of said two door has a rib disposed on an exterior thereof, said rib being oriented at an acute angle relative to said width of said tape.

23. A cartridge and drive system as claimed in claim 22 wherein the respective ribs on said two doors form a V-shape when said two doors are closed.

24. A magnetic tape cartridge comprising:

a housing enclosure;

two tape reels rotatably mounted in said housing enclosure;

a magnetic data recording tape wound on said two reels for winding and unwinding between said two reels in a tape transport direction, said tape having a width perpendicular to said tape transport direction of at least approximately 24 mm;

said housing enclosure having two reel access openings respectively disposed in registration with the reels allowing external access to said reels for rotating said reels, and a tape access opening allowing external access to said tape and removal of a portion of said tape from said housing enclosure, said housing enclosure having a wall in which said two reel access openings are disposed, and a side perpendicular to said wall and parallel to said width of said tape, with said tape access opening being disposed in said wall and in said side; and, said tape access opening having a first portion in said wall adapted to allow insertion of a data transfer head through said first portion in a direction parallel to said width of said tape, and a second portion in said side for said removal of said portion of said tape from said housing enclosure in a direction perpendicular to said width of said tape and perpendicular to said tape transport direction.

25. A magnetic tape cartridge as claimed in claim 24 wherein said housing enclosure has at least one door mounted for sliding along said wall and along said side for opening and closing said tape access opening, said at least one door having a first door portion covering said first portion of said tape access opening and a second door portion covering said second portion of said tape access opening.

26. A magnetic tape cartridge as claimed in claim 25 wherein said at least one door has a rib disposed at an exterior thereof, said rib being oriented at an acute angle relative to said width of said tape.

27. A magnetic tape cartridge as claimed in claim 24 wherein said housing enclosure has two doors, each mounted for sliding on said wall and said side toward and away from each other for opening and closing said tape access opening, each of said two doors having a first door portion covering approximately one-half of said first portion of said tape access opening and a second door portion covering approximately one-half of said second portion of said tape access opening.

28. A magnetic tape cartridge as claimed in claim 27 wherein each of said two doors has a rib disposed on an exterior thereof, said rib being oriented at an acute angle relative to said width of said tape.

29. A magnetic tape cartridge as claimed in claim 28 wherein the respective ribs on said two doors form a V-shape when said two doors are closed.

* * * * *